United States Patent [19]

Blytas

[11] Patent Number: 4,500,333
[45] Date of Patent: Feb. 19, 1985

[54] AQUEOUS ELECTROLYTE DESICCATION OF SUBSTANTIALLY SUPERCRITICAL $CO_2$

[75] Inventor: George C. Blytas, Houston, Tex.

[73] Assignee: Shell Oil Company, Houston, Tex.

[21] Appl. No.: 556,249

[22] Filed: Nov. 29, 1983

[51] Int. Cl.³ .............................................. F25J 3/00
[52] U.S. Cl. ........................................ 62/17; 55/68; 423/437
[58] Field of Search ............... 423/437; 62/17, 20; 55/68

[56] References Cited

U.S. PATENT DOCUMENTS 3,100,685  8/1963  Duffey ............................... 423/437
3,317,278  5/1967  Ruhemann et al. ............... 423/437

Primary Examiner—Frank Sever

[57] ABSTRACT

The drying of moist $CO_2$ at conditions above or near the critical point of $CO_2$ is improved by contacting the $CO_2$ with an aqueous liquid electrolyte desiccant.

3 Claims, 1 Drawing Figure

— PURE $CO_2$
--- 96 m% $CO_2$ & 4 m% $N_2$

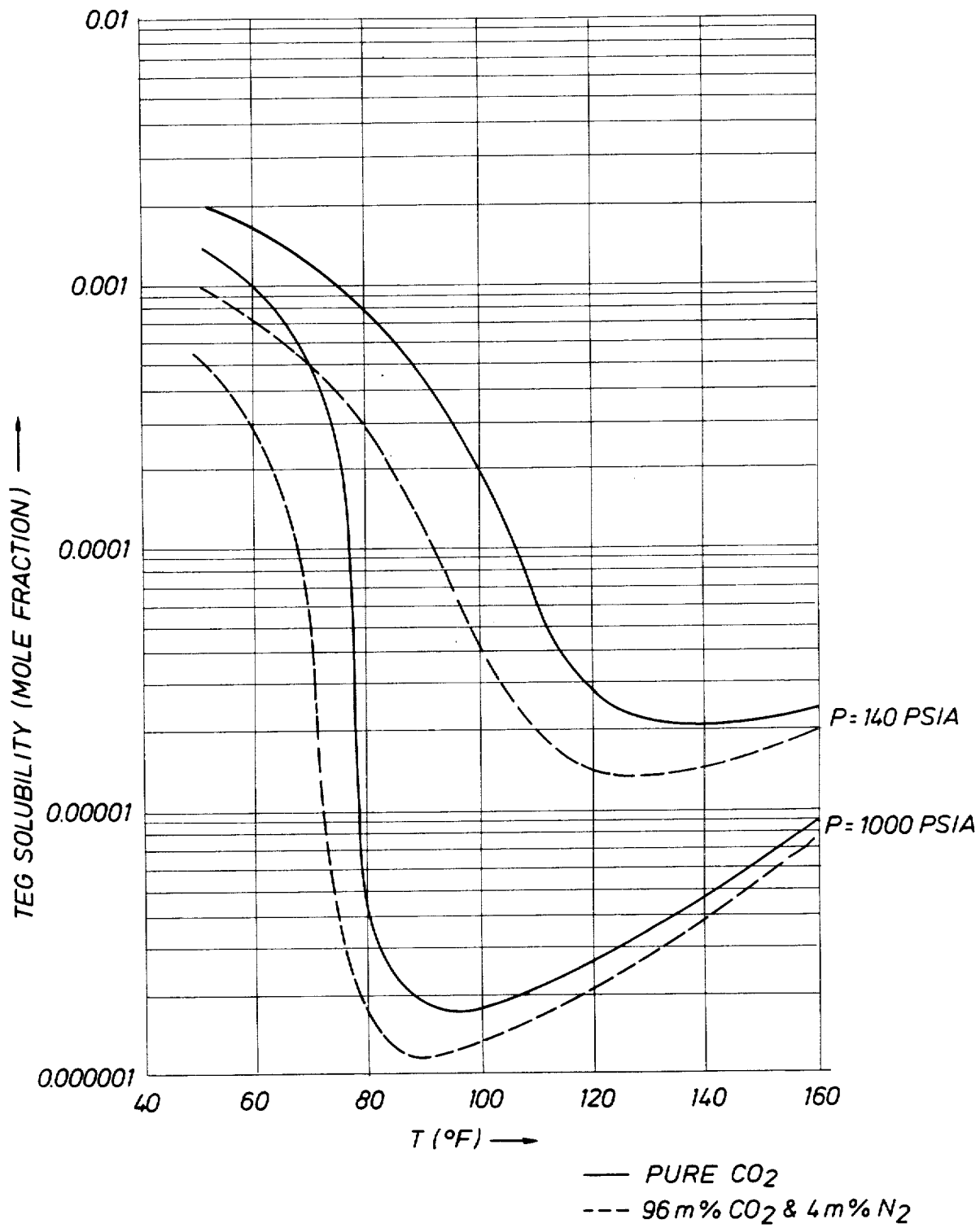

AQUEOUS ELECTROLYTE DESICCATION OF SUBSTANTIALLY SUPERCRITICAL $CO_2$

CROSS REFERENCE TO RELATED APPLICATIONS

The following commonly assigned patent applications are related to the present invention: application Ser. No. 501,383 filed June 6, 1983 by Ziada Diaz and James H. Miller describes drying near critical $CO_2$ with an electrolyte desiccant adsorbed on a permeable solid desiccant. Application Ser. No. 501,668 filed June 6, 1983 by Zaida Diaz describes drying near critical $CO_2$ with an aqueous electrolyte desiccant upstream of a permeable solid desiccant. Application Ser. No. 517,594 filed July 7, 1983 describes drying near critical $CO_2$ with glycerol. The disclosures of those applications are incorporated herein by reference.

BACKGROUND OF THE INVENTION

The present invention relates to a process for drying moist $CO_2$ at conditions above or near the critical point (87.9° F. and 1071 psia). More particularly, the present invention relates to an efficient process for drying supercritical or nearcritical $CO_2$ to an extent materially reducing its corrosivity without the severe loss of desiccant and contamination of $CO_2$ which happens in drying $CO_2$ with a glycol such as triethylene glycol at conditions above or near the critical point of $CO_2$.

Numerous desiccants and systems for drying gases are described in U.S. patents such as the following: U.S. Pat. No. 2,812,830 describes a system using triethylene glycol (TEG) and recycling partially spent TEG while removing most of the water with dry TEG. U.S. Pat. No. 3,390,511 describes a gas drying system using aqueous electrolyte desiccant adsorbed on water soluble carrier pellets such as sodium chloride pellets. U.S. Pat. No. 3,609,942 describes the drying of wet hydrocarbon gases at pressures of from about 500 to 2000 psig with ethylene glycol or other glycols. U.S. Pat. No. 3,750,369 describes a system for regenerating spent liquid desiccant such as a glycol hygroscopic solution of electrolytes such as lithium, calcium or other chloride salts. U.S. Pat. No. 3,885,926 describes an aqueous desiccant solution of calcium chloride and magnesium nitrate which is said to be particularly suitable for dehydrating hydrocarbon gases. U.S. Pat. No. 4,235,289 describes a system for producing supercritical $CO_2$ from a subterranean reservoir and drying it with TEG to provide dried supercritical $CO_2$. U.S. Pat. No. 4,344,486 describes an oil recovery process for producing $CO_2$ containing contaminants such as hydrocarbons and hydrogen sulfides from an underground reservoir, burning the mixture to form a concentrated carbon dioxide stream, compressing and dehydrating that stream with a molecular sieve or ethylene glycol water-removing arrangement and injecting the treated $CO_2$.

Such patents contain no suggestion of any significant problem due to a glycol such as TEG remaining dissolved in the dehydrated $CO_2$.

An article in Oil and Gas Journal, Nov. 8, 1971, page 53, describes preliminary plans for pipelining $CO_2$ to the Sacroc unit of the Wasson field for use in oil recovery. The article describes the desirability of maintaining a pressure greater than about 1400 psig to keep the $CO_2$ supercritical and indicates that a maximum of 50 parts per million of water in the dehydrated $CO_2$ would adequately prevent corrosion of the pipeline. It also indicates that, in pilot tests, drying with TEG appeared satisfactory but "little experience exists in large scale dehydration of $CO_2$ produced from natural gas wells". An Oil and Gas Journal article (Jan. 3, 1983, page 92) relating to $CO_2$ injection for enhanced oil recovery, indicates that the gas should be dehydrated to a water dew point of about 10° F. below the minimum ambient temperature and that TEG offers the best combination of ease in operation and economics since dew points obtained with it are normally within the range required for $CO_2$ handling systems. An Oil and Gas Journal article (Mar. 21, 1983, page 160) indicates that "Corrosion by $CO_2$ can be prevented in gas transmission lines by dehydrating the gas to less than 60% relative humidity for the coldest portion of the pipeline." and also that oil-soluble amine film-forming inhibitors can be used in $CO_2$ pipelines.

In summary, the prior art teachings and beliefs indicate (1) the desirability of pipelining $CO_2$ as a supercritical single phase fluid, (2) the desirability of drying such $CO_2$ to a non-corrosive moisture content, and (3) an expectation that triethylene glycol is the best desiccant for such a drying operation.

SUMMARY OF THE INVENTION

The present invention relates to a process for drying water-containing $CO_2$, at conditions above or near its critical point, to a substantially non-corrosive water content, while maintaining high drying efficiency and minimizing desiccant loss and product contamination due to desiccant solubility. The supercritical or nearcritical $CO_2$ is flowed into and out of contact with an aqueous liquid desiccant solution or pumpable slurry having water-removing capacities and efficiencies at least substantially equivalent to those provided by a calcium choride desiccant solution.

BRIEF DESCRIPTION OF THE DRAWINGS

The FIGURE illustrates a plot of comparative solubilities of triethylene glycol in pure $CO_2$ and various $CO_2$-rich mixtures with increasing temperature and at various pressures.

DESCRIPTION OF THE INVENTION

The present invention is, at least in part, premised on a discovery that a significant problem exists in a large scale use of the previously suggested procedures for drying supercritical or nearcritical $CO_2$ to a substantially non-corrosive degree. The desiccant previously considered to be the most cost effective and versatile, triethylene glycol, has been found to exhibit an undesirably high solubility which varies widely with relatively small variations in pressure and temperature. Aqueous liquid desiccants, such as pumpable slurries or solutions of lithium and/or calcium halides (such as the chlorides), have a suitably low solubility in supercritical or nearcritical $CO_2$. They also have a high water capacity and a drying efficiency suitable for removing water from said $CO_2$ to or near the low levels required for corrosion protection.

It has been discovered that it is possible to achieve a high capacity for water removal, small desiccant loss and a high drying efficiency by a desiccant system in which an electrolyte desiccant is dissolved or suspended in an aqueous liquid. Such an aqueous liquid desiccant has the following advantages for nearcritical $CO_2$ drying:

1. very low solubility in $CO_2$ and low volatility; (conducive to small desiccant losses),
2. high water capacity,
3. good drying efficiency (low dewpoints),
4. regeneration by a relatively mild heating; conducive to the use of waste heat.

Particularly attractive sources of $CO_2$ for use in oil recovery operations comprise subterranean reservoirs such as those in the McElmo Dome and Doe Canyon fields. In a particularly attractive $CO_2$-producing procedure, the $CO_2$ is produced as a supercritical single-phase fluid. This plus the desirability of supercritical pipelining provides a desirability for dehydrating the $CO_2$ at conditions above but near the critical point. In such operations, changes over several orders of magnitude can occur in the solubility of triethylene glycol in the $CO_2$ being dehydrated.

Equation of state calculations were performed to establish correlation patterns of TEG losses in $CO_2$ drying facilities. The FIGURE shows a graph of the calculated solubility of TEG in $CO_2$ as a function of temperature along isobars close to the critical pressure of 1071 psia with variations in temperatures near the critical temperature of 87.9° F. At pressures close to the critical pressure, the solubility reaches a minimum value as a temperature increases to about the critical temperature after which it starts increasing with increasing temperature. With increasing pressure the minimum of the curves shift to a higher temperature and the sudden drop becomes less pronounced. An addition of an inert diluent such as nitrogen to the $CO_2$ results in a decrease in the solubility of TEG over the range of near critical conditions while at the same time shifting the minimum of the curves to lower temperatures.

Tests of the water capacity of electrolyte systems have indicated that, for example, at 115° F. and 1250 psi, the amount of water which was removed from the $CO_2$ before the water content of the $CO_2$ rose to 0.39 milligrams per liter, when the electrolyte was a concentrated slurry of aqueous lithium chloride, was 0.70 g water/g electrolyte.

As known to those skilled in the art, numerous devices and arrangements are known for flowing a stream of gas into and out of contact with either liquid or solid desiccants. In addition, appropriate means for avoiding problems of maintenance, corrosion prevention, and reactivation of spent desiccants, are known. Substantially any of such devices and procedures can be utilized in the present process.

The present process can be used in conjunction with corrosion inhibitors, hydrate inhibitors, and the like. For example, where produced supercritical $CO_2$ is to be flowed from producing wells to a central treating station, a hydrate inhibitor such as methanol can be added at the wellheads before the produced $CO_2$ enters gathering lines through which it is flowed into a central processing station, for example, in a manner such as that described in U.S. Pat. No. 4,235,289. Such a hydrate inhibitor can be condensed out of the $CO_2$ stream being treated by means of conventional procedures and devices.

One advantage of the present invention is the ease with which it can be adjusted to changing climatic conditions, pumping arrangements, and/or changing concentrations of fluids produced along with the $CO_2$ from subterranean reservoirs, or the like. Depending upon factors such as the conditions at which the dried $CO_2$ is injected into a pipeline, the conditions to which it will be subjected as it is transported into a use location, the number of pumping stations that will be involved, the expense and desirability of utilizing some corrosion inhibitor to maintain a selected same rate of corrosion while using less drying and thus leaving a higher water content, changes may be desirable from time to time in the maximum amount of water to be left in the dried $CO_2$.

Electrolytes which are suitable as desiccants in the present process are hygroscopic salts capable of forming aqueous solutions or pumpable slurries or suspensions having water-removing capacities and efficiencies at least substantially equivalent to those provided by a calcium chloride desiccant solution. The anhydrous form of the salt used should have a very low solubility in supercritical $CO_2$. Particularly suitable salts for use in the present process are lithium chloride, calcium chloride and their mixtures. Examples of other suitable salts include calcium and/or lithium bromides.

What is claimed is:

1. A process for drying water-containing $CO_2$ at conditions near or above its critical point comprising:
    flowing said $CO_2$, at conditions near or above its critical point, into and out of contact with an aqueous liquid desiccant solution or pumpable slurry having water-removing capacities and efficiencies at least substantially equivalent to those provided by a calcium chloride desiccant solution, sufficient to render said $CO_2$ substantially non-corrosive.
2. The process of claim 1 in which the electrolyte desiccant is lithium and/or calcium chloride.
3. The process of claim 1 in which the electrolyte desiccant is lithium chloride.

* * * * *